US012090655B2

(12) United States Patent
Yamaguchi et al.

(10) Patent No.: US 12,090,655 B2
(45) Date of Patent: Sep. 17, 2024

(54) ROBOT, MASTERING FIXTURE, MASTERING SYSTEM, AND MASTERING METHOD

(71) Applicant: FANUC CORPORATION, Yamanashi (JP)

(72) Inventors: Koudai Yamaguchi, Yamanashi (JP); Toshihiko Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/005,083

(22) PCT Filed: Jul. 19, 2021

(86) PCT No.: PCT/JP2021/026948
§ 371 (c)(1),
(2) Date: Jan. 11, 2023

(87) PCT Pub. No.: WO2022/019262
PCT Pub. Date: Jan. 27, 2022

(65) Prior Publication Data
US 2023/0339097 A1 Oct. 26, 2023

(30) Foreign Application Priority Data
Jul. 22, 2020 (JP) .............................. 2020-125421

(51) Int. Cl.
*B25J 9/00* (2006.01)
(52) U.S. Cl.
CPC ................... *B25J 9/0009* (2013.01)
(58) Field of Classification Search
CPC ......... B25J 9/1692; B25J 9/0009; B25J 19/00

USPC ....................................................... 74/490.05
See application file for complete search history.

(56) References Cited

U.S. PATENT DOCUMENTS

| 4,505,049 A | * | 3/1985 | Kuno | ................... B25J 13/088 |
| | | | | 33/655 |
| 6,418,774 B1 | * | 7/2002 | Brogrdh et al. | ....... B25J 9/1692 |
| | | | | 73/1.75 |

FOREIGN PATENT DOCUMENTS

| CN | 106031989 A | 10/2016 |
| JP | S55002683 U | 1/1980 |
| JP | S60149724 U | 10/1985 |
| JP | H06008185 A | 1/1994 |
| JP | 2004223576 A | 8/2004 |
| JP | 2005342860 A | 12/2005 |
| JP | 3841757 B | 11/2006 |
| JP | 4168008 B | 10/2008 |
| JP | 2011251365 A | 12/2011 |
| JP | 2012035371 A | 2/2012 |
| JP | 2014046399 A | 3/2014 |

(Continued)

*Primary Examiner* — T. Scott Fix
(74) *Attorney, Agent, or Firm* — Maier & Maier, PLLC

(57) ABSTRACT

A robot in which two members constituting a joint shaft and supported in a relatively movable manner are each provided with a V-shaped groove having two sloped inner surfaces intersecting each other at a linear groove bottom extending orthogonally to a movement direction, or a V-shaped protrusion having two sloped outer surfaces intersecting each other at a linear ridge extending orthogonally to the movement direction. When the two members of the joint shaft are disposed in a predetermined operational position, the groove bottoms, the ridges, or the groove bottom and the ridge are disposed in alignment with each other.

3 Claims, 15 Drawing Sheets

(56) References Cited

FOREIGN PATENT DOCUMENTS

JP  2016163001 A  9/2016
WO  WO-8502575 A  *  6/1985  .............. B25J 9/046

* cited by examiner

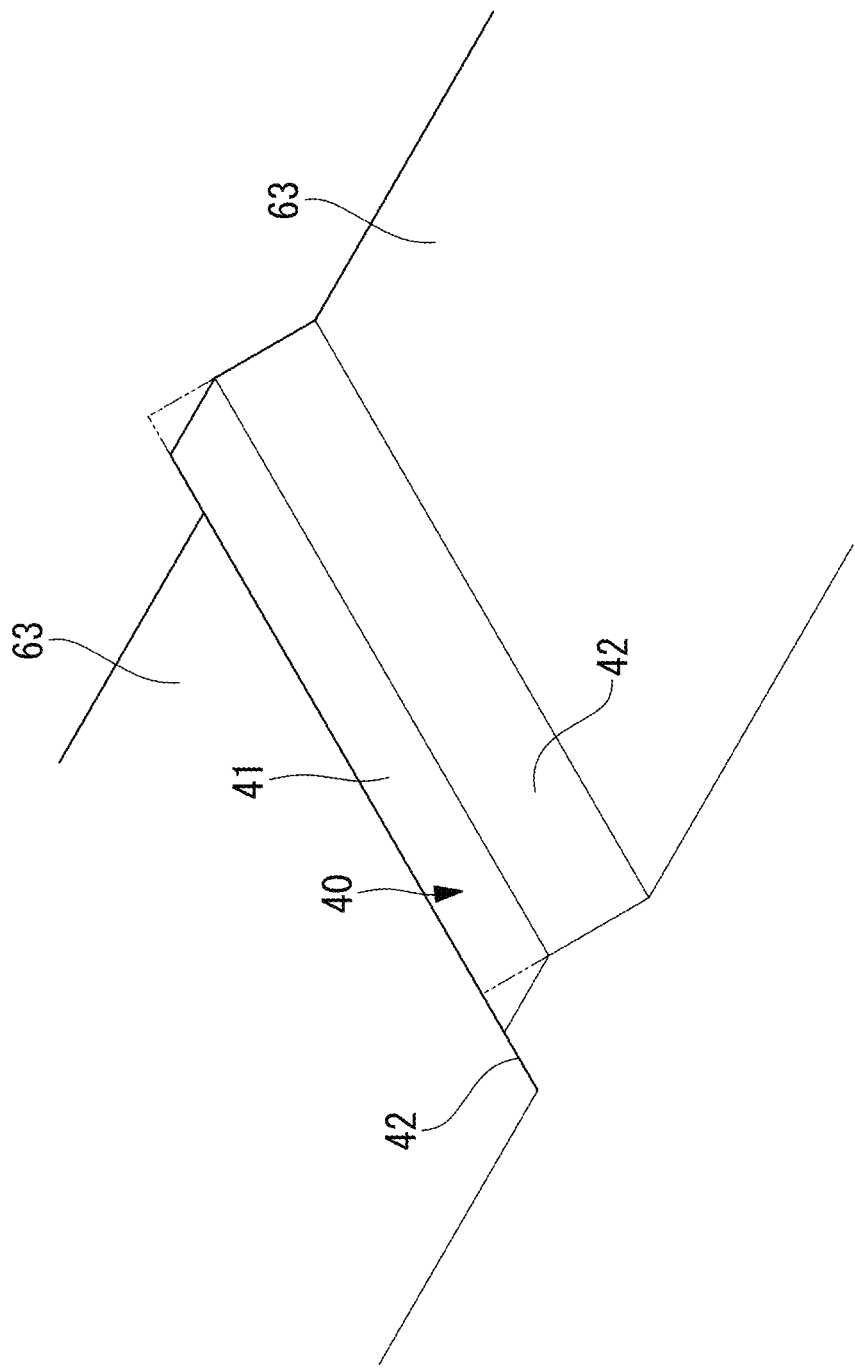

ROBOT, MASTERING FIXTURE, MASTERING SYSTEM, AND MASTERING METHOD

TECHNICAL FIELD

The present disclosure relates to robots, mastering fixtures, mastering systems, and mastering methods.

BACKGROUND

In a known robot, two members connected in such a manner as to be rotatable relative to each other via a joint shaft are respectively provided with markers like marking-off lines for positioning the two members with respect to each other (for example, see Japanese Unexamined Patent Application, Publication No. 2011-251365).

In a state where the joint shaft is mastered, the markers like marking-off lines provided on the two members at the joint shaft are aligned with each other, so that after a motor or a reducer for the joint shaft has been replaced, the joint shaft can be simply restored to its origin position by using the markers.

A known mastering method involves attaching a fixture to a base having a reference flat surface and using a measurement device to measure the distance between the reference flat surface and a movable flat surface of a movable section connected rotatably around a rotation shaft (for example, see Japanese Unexamined Patent Application, Publication No. 2014-46399).

SUMMARY

An aspect of the present disclosure provides a robot in which two members constituting a joint shaft and supported in a relatively movable manner are each provided with a V-shaped groove having two sloped inner surfaces intersecting each other at a linear groove bottom extending orthogonally to a movement direction or a V-shaped protrusion having two sloped outer surfaces intersecting each other at a linear ridge extending orthogonally to the movement direction. When the two members of the joint shaft are disposed in a predetermined operational position, the groove bottoms, the ridges, or the groove bottom and the ridge are disposed in alignment with each other.

BRIEF DESCRIPTION OF THE DRAWINGS

FIG. 15 is a perspective view illustrating a modification of a protrusion provided on the first fixture in FIG. 3 or the second fixture in FIG. 5.

DETAILED DESCRIPTION OF THE EMBODIMENTS

A robot 1, a mastering fixture 50, a mastering system, and a mastering method according to an embodiment of the present disclosure will be described below with reference to the drawings.

The mastering system according to this embodiment includes the robot 1 and the mastering fixture 50.

Figure 1:
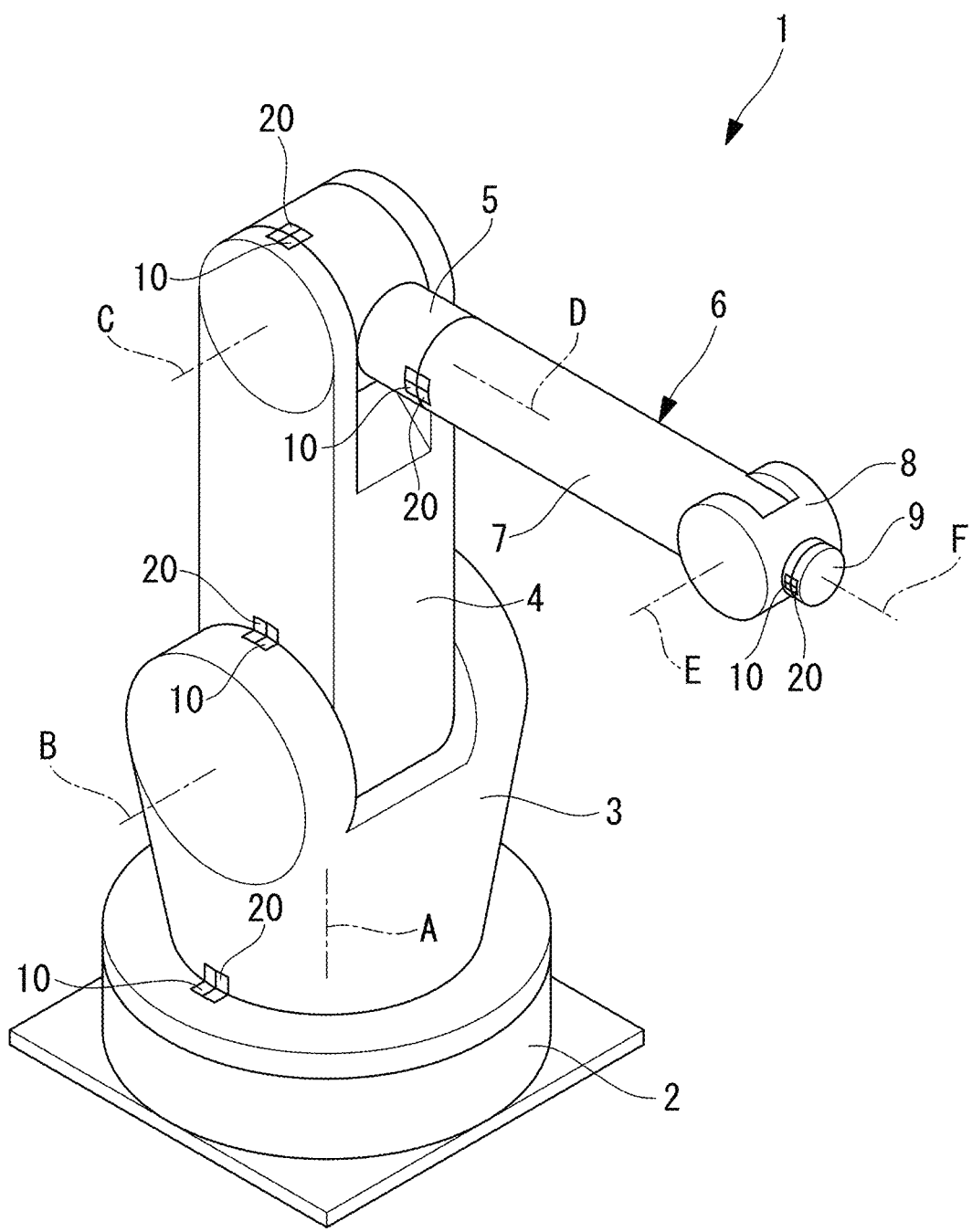
FIG. 1 is an overall view illustrating an example of a robot according to an embodiment of the present disclosure.

For example, as shown in FIG. 1, the robot 1 according to this embodiment is a vertical articulated robot including six rotational joint shafts (joint shafts). The robot 1 includes a base (member) 2 set on a floor surface, a swivel body (member) 3 supported by the base 2 in such a manner as to be rotatable around a first axis A, which is vertical, and a first arm (member) 4 supported by the swivel body 3 in such a manner as to be rotatable around a second axis B, which is horizontal. Furthermore, the robot 1 includes a second arm (member) 5 supported by the first arm 4 in such a manner as to be rotatable around a third axis C parallel to the second axis B, and a three-axis wrist unit 6 disposed at the distal end of the second arm 5.

The wrist unit 6 includes a first wrist component (member) 7 supported by the second arm 5 in such a manner as to be rotatable around a fourth axis D disposed within a plane orthogonal to the third axis C. The wrist unit 6 also includes a second wrist component (member) 8 supported by the first wrist component 7 in such a manner as to be rotatable around a fifth axis E orthogonal to the fourth axis D. Furthermore, the wrist unit 6 includes a third wrist component (member) 9 supported by the second wrist component 8 in such a manner as to be rotatable around a sixth axis F orthogonal to the fifth axis E and intersecting the third axis C.

Each of the rotational joint shafts includes two members that are rotatable relative to each other. For example, the first rotational joint shaft includes the base 2 and the swivel body 3 that are rotatable relative to each other. The second rotational joint shaft includes the swivel body 3 and the first arm 4 that are rotatable relative to each other. The third rotational joint shaft includes the first arm 4 and the second arm 5 that are rotatable relative to each other.

The fourth rotational joint shaft includes the second arm 5 and the first wrist component 7 that are rotatable relative to each other. The fifth rotational joint shaft includes the first wrist component 7 and the second wrist component 8 that are rotatable relative to each other. The sixth rotational joint shaft includes the second wrist component 8 and the third wrist component 9 that are rotatable relative to each other.

The two members 2, 3, 4, 5, 7, 8, 9 constituting each rotational joint shaft are provided with mastering mounting surfaces 10 at positions adjacent to the boundary between the two members 2, 3, 4, 5, 7, 8, 9. Since the mastering mounting surfaces 10 and 20 at the respective rotational joint shafts are identical, the mastering mounting surfaces 10 and 20 respectively provided on the swivel body 3 and the first arm 4 that constitute the second rotational joint shaft will be described here as an example.

Figure 2:
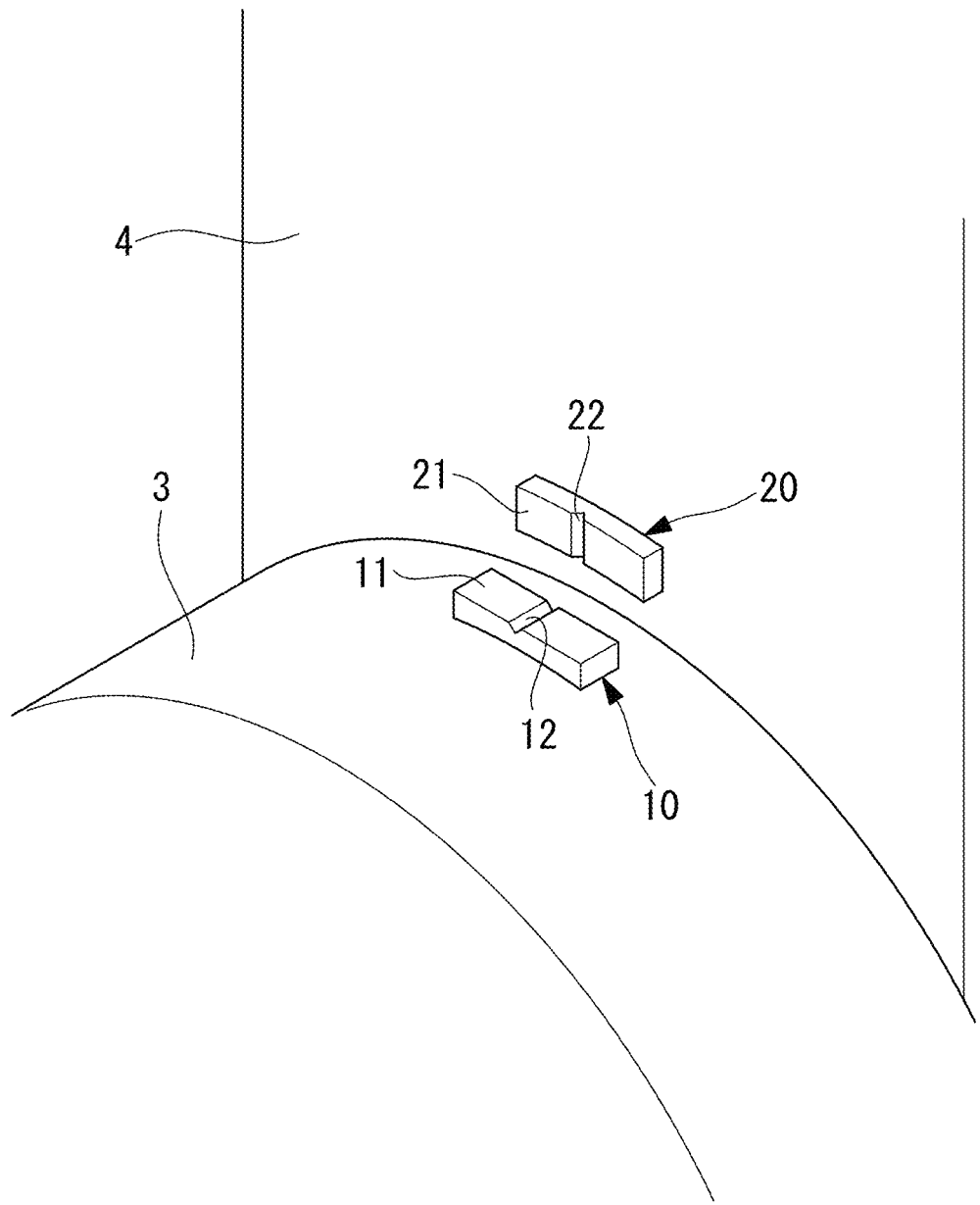
FIG. 2 is a perspective view illustrating an example of two mastering mounting surfaces provided at a second rotational joint shaft of the robot in FIG. 1.

As shown in FIG. 2, the mastering mounting surface 10 of the swivel body 3 is provided on a cylindrical outer peripheral surface located adjacent to the boundary between the swivel body 3 and the first arm 4 and centered on the second axis B. The mastering mounting surface 20 of the first arm 4 is provided on a side surface located adjacent to the boundary between the first arm 4 and the swivel body 3 and orthogonal to the second axis B, and is positioned radially outward away from the second axis B relative to the mastering mounting surface 10 of the swivel body 3.

Figure 3:
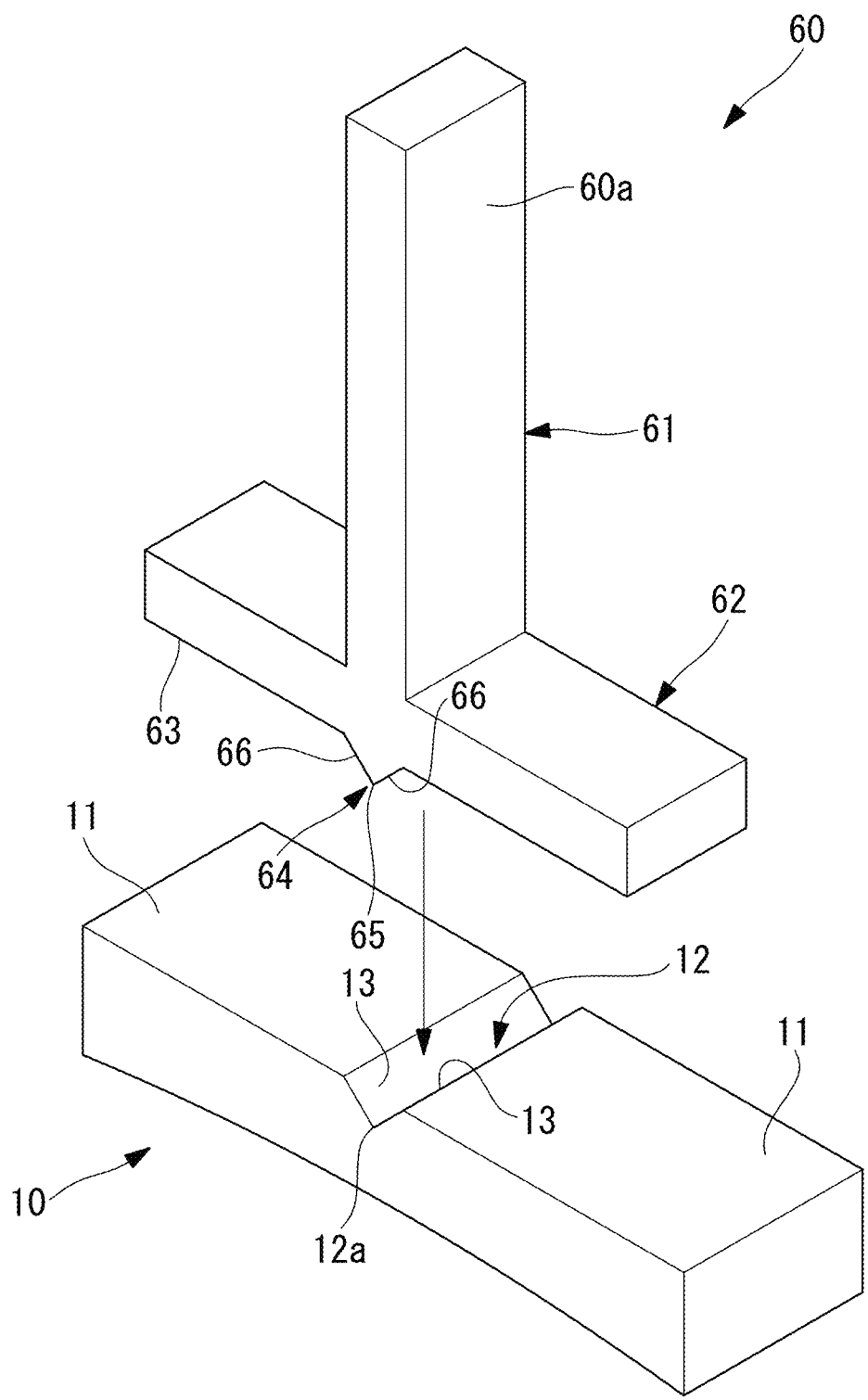
FIG. 3 is a perspective view illustrating an example of a mastering mounting surface provided on a swivel body in FIG. 2 and a first fixture to be positioned on the mastering mounting surface.

As shown in FIG. 3, the mastering mounting surface 10 of the swivel body 3 includes a mounting surface 11 serving as a flat surface extending in the tangential direction of a circle centered on the second axis B and a V-shaped groove (recess) 12 formed by partially cutting out the mounting surface 11. The V-shaped groove 12 has sloped inner surfaces 13 that are two flat surfaces intersecting each other at a predetermined angle, such as 90°, at a linear groove bottom 12a extending parallel to the second axis B. The direction in which the first arm 4 moves relative to the swivel body 3 is the tangential direction of the circle centered on the second axis B, and the groove bottom 12a of the V-shaped groove 12 extends in a direction orthogonal to the movement direction of the first arm 4.

Figure 5:
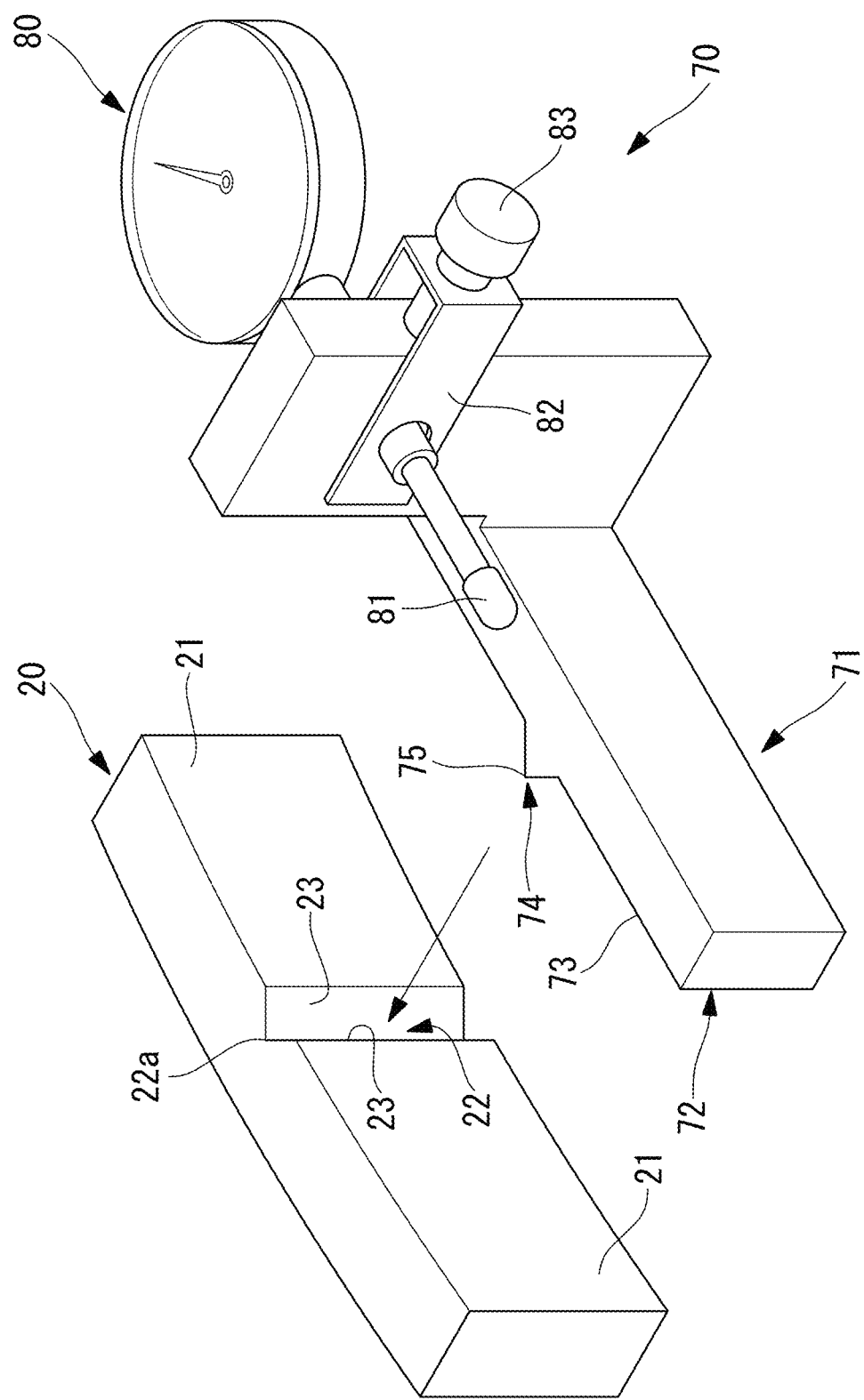
FIG. 5 is a perspective view illustrating an example of the mastering mounting surface provided on the arm in FIG. 2 and a second fixture to be positioned on the mastering mounting surface.

As shown in FIG. 5, the mastering mounting surface 20 of the first arm 4 includes a mounting surface 21 serving as a flat surface orthogonal to the second axis B and a V-shaped groove (recess) 22 formed by partially cutting out the mounting surface 21. The V-shaped groove 22 has sloped inner surfaces 23 that are two flat surfaces intersecting each other at a predetermined angle, such as 90°, at a linear groove bottom 22a extending in a direction orthogonal to the second axis B. The groove bottom 22a of the V-shaped groove 22 extends in the direction orthogonal to the direction in which the first arm 4 moves relative to the swivel body 3.

The mastering mounting surface 10 of the swivel body 3 is formed by machining the mounting surface 11 and the V-shaped groove 12 during a machining process of a member constituting the swivel body 3. The mastering mounting surface 20 of the first arm 4 is formed by machining the mounting surface 21 and the V-shaped groove 22 during a machining process of a member constituting the first arm 4. The mastering mounting surfaces 10 and 20 of the swivel body 3 and the first arm 4 are formed at positions where the groove bottoms 12a and 22a of the V-shaped grooves 12 and 22 are disposed within the same plane when the first arm 4 is disposed in an origin position, such as the position in FIG. 1, as a design value relative to the swivel body 3.

The mastering fixture 50 according to this embodiment will now be described below with reference to the drawings.

The mastering fixture 50 includes a first fixture 60 disposed in a positioned state on the mastering mounting surface 10 of one member 2, 3, 4, 5, 7, or 8 of the two members 2, 3, 4, 5, 7, 8, 9 constituting each rotational joint shaft, and a second fixture 70 disposed in a positioned state on the mastering mounting surface 20 of the other member 3, 4, 5, 7, 8, or 9. The mastering fixture 50 includes a dial gauge (measurement device) 80 fixed to the first fixture 60 or the second fixture 70.

The mastering fixture 50 for mastering the swivel body 3 and the first arm 4 that constitute the second rotational joint shaft will be described here as an example.

As shown in FIG. 3, the first fixture 60 includes a tabular main section 61 having a reference flat surface (reference surface) 60a, and also includes a tabular positioning section 62 provided at one end of the main section 61 and extending orthogonally to the main section 61.

The surface of the positioning section 62 located opposite from the main section 61 is provided with an abutment surface 63 serving as a flat surface that is to abut on the mounting surface 11 of the mastering mounting surface 10, and a V-shaped protrusion (protrusion) 64 protruding partially from the center of the abutment surface 63. The V-shaped protrusion 64 has sloped outer surfaces 66 that are two flat surfaces intersecting each other at a predetermined angle, such as 90°, at a linear ridge 65, and has a complementary shape with respect to the V-shaped groove 12 in the mastering mounting surface 10. Specifically, when the V-shaped protrusion 64 is fitted into the V-shaped groove 12 in the mastering mounting surface 10, the two sloped outer surfaces 66 are simultaneously brought into close contact with the two sloped inner surfaces 13 of the V-shaped groove 12.

The reference flat surface 60a is orthogonal to the abutment surface 63 and is disposed parallel to the ridge 65 of the V-shaped protrusion 64.

When the V-shaped protrusion 64 of the first fixture 60 is fitted into the V-shaped groove 12 in the mastering mounting surface 10 of the swivel body 3 and the abutment surface 63 is brought into abutment with the mounting surface 11, the two sloped outer surfaces 66 of the V-shaped protrusion 64 simultaneously come into close contact with the two sloped inner surfaces 13 of the V-shaped groove 12, and the abutment surface 63 comes into close contact with the mounting surface 11. In this state, the reference flat surface 60a provided on the first fixture 60 is disposed in a positioned state where it extends orthogonally to the mounting surface 11 and parallel to the second axis B.

By engaging the V-shaped protrusion 64 with the V-shaped groove 12, the first fixture 60 is permitted to move relative to the mastering mounting surface 10 of the swivel body 3 only along the groove bottom 12a of the V-shaped groove 12. Accordingly, the reference flat surface 60a of the first fixture 60 is positioned relative to the swivel body 3, so that the position of the reference flat surface 60a is not shifted even if the first fixture 60 is moved in the extending direction of the second axis B along the V-shaped groove 12, as indicated by an arrow X in FIG. 6.

Figure 4:
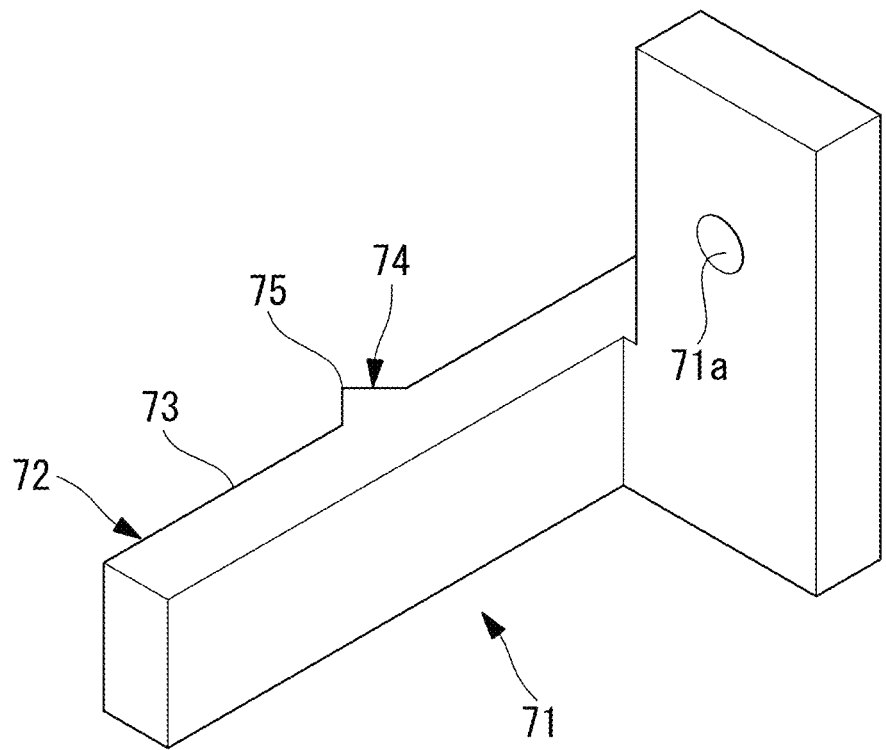
FIG. 4 is a perspective view illustrating an example of a bracket of a second fixture to be positioned on a mastering mounting surface provided on an arm in FIG. 2.

As shown in FIGS. 4 and 5, the second fixture 70 includes a bracket 71 to be positioned on the mastering mounting surface 20 provided on the first arm 4, and also includes the dial gauge 80 to be fixed to a through-hole 71a in the bracket 71.

The bracket 71 includes a positioning section 72 to be positioned on the mastering mounting surface 20 provided on the first arm 4. The positioning section 72 has a shape similar to that of the positioning section 62 of the first fixture 60. The positioning section 72 includes a flat abutment surface 73 that is to abut on the mounting surface 21 of the mastering mounting surface 20, and also includes a V-shaped protrusion (protrusion) 74 protruding partially from the abutment surface 73 and having a complementary shape with respect to the V-shaped groove 22 in the mastering mounting surface 20.

The dial gauge 80 is of a type that causes a plunger 81 to extend and retract, and is fixed to the bracket 71 such that the plunger 81 is extended and retracted in a direction parallel to the abutment surface 73 along a plane orthogonal to a ridge 75 of the V-shaped protrusion 74. In FIG. 5, reference sign 82 denotes an attachment fitting used for attaching the dial gauge 80 to the bracket 71, and reference sign 83 denotes an attachment screw. The dial gauge 80 may be reset at a position where the amount by which the distal end of the plunger 81 protrudes from the bracket 71 reaches a predetermined amount.

By engaging the V-shaped protrusion 74 with the V-shaped groove 22, the second fixture 70 is permitted to move relative to the mastering mounting surface 20 of the first arm 4 only along the groove bottom 22a of the V-shaped groove 22. Accordingly, the dial gauge 80 of the second fixture 70 is positioned relative to the first arm 4. When the first fixture 60 is accurately positioned, the amount by which the distal end of the plunger 81 of the dial gauge 80 protrudes does not change even if the second fixture 70 is moved in the direction orthogonal to the second axis B along the V-shaped groove 22, as indicated by an arrow Y in FIG. 6.

When the first fixture 60 is brought into abutment with the mastering mounting surface 10 of the swivel body 3, the second fixture 70 is brought into abutment with the mastering mounting surface 20 of the first arm 4, and the operational position of the first arm 4 around the second axis B relative to the swivel body 3 is adjusted, the distal end of the plunger 81 of the dial gauge 80 abuts on the reference flat surface 60a. Accordingly, the relative positional relationship (distance) between the swivel body 3 and the first arm 4 can be measured by the dial gauge 80.

The mastering method according to the embodiment of the present disclosure will now be described.

The mastering method according to this embodiment includes measuring a first distance by using the mastering fixture 50 in a state where the robot 1 is mastered. The first distance is to be measured by using the dial gauge when the two members 2, 3, 4, 5, 7, 8, 9 of each rotational joint shaft are disposed in a first operational position.

Figure 7:
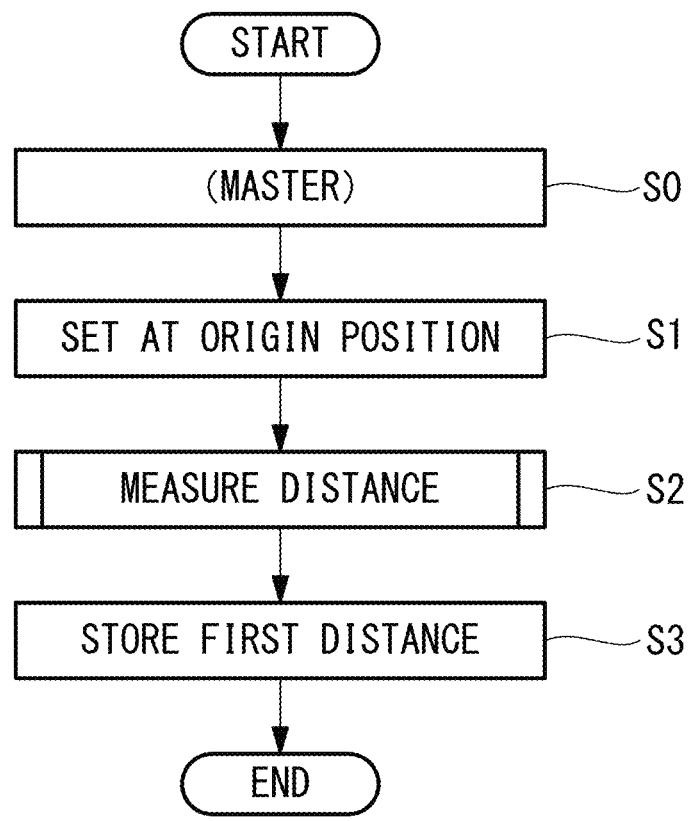
FIG. 7 is a flowchart for explaining a part of a mastering method according to an embodiment of the present disclosure.

The measurement of the first distance will be described with reference to, for example, the second rotational joint shaft as an example. As shown in FIG. 7, in a mastered state (step S0), the rotational angle position of the first arm 4 relative to the swivel body 3 is adjusted, so that the swivel body 3 and the first arm 4 are disposed in the first operational position, such as the origin position (step S1). In this state, a distance measurement process (step S2) is performed.

Figure 8:
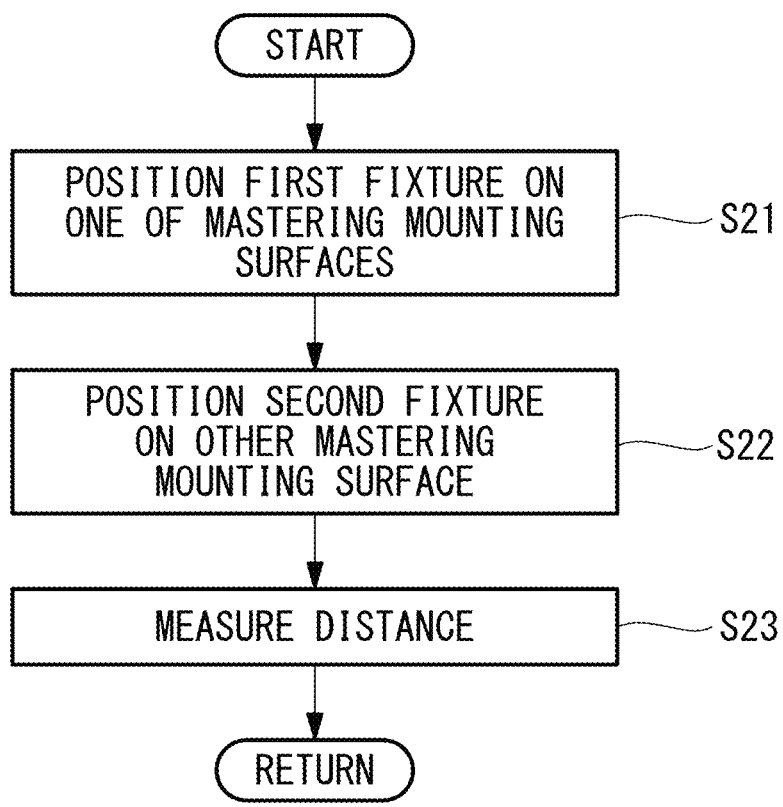
FIG. 8 is a flowchart for explaining a distance measurement process in the mastering method in FIG. 7.

As shown in FIG. 8, the distance measurement process in step S3 includes disposing the first fixture 60 in a positioned state on the mastering mounting surface 10 of the swivel body 3 (step S21) and disposing the second fixture 70 in a positioned state on the mastering mounting surface 20 of the first arm 4 (step S22). As shown in FIG. 2, in the origin position, the groove bottom 12a of the V-shaped groove 12 in the mastering mounting surface 10 of the swivel body 3 and the groove bottom 22a of the V-shaped groove 22 in the mastering mounting surface 20 of the first arm 4 are arranged in the same plane.

When the swivel body 3 and the first arm 4 are disposed in the first operational position, the distal end of the plunger 81 of the dial gauge 80 is pushed by the reference flat surface 60a of the first fixture 60, and the first distance is measured by the dial gauge 80 (step S23). The measured first distance is stored (step S3).

Figure 9:
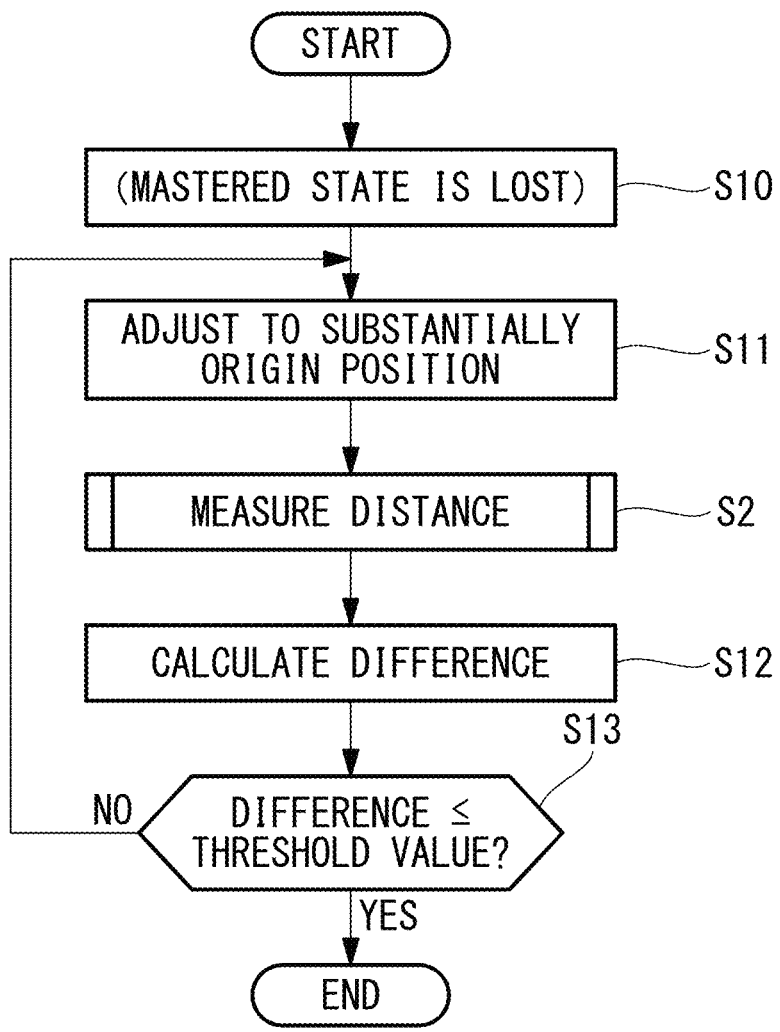
FIG. 9 is a flowchart for explaining a part of the mastering method in FIG. 7.

Subsequently, the motor or the reducer driving the second rotational joint shaft is replaced. Thus, in a non-mastered state (step S10), a second distance is measured using the same method as in step S1, as shown in FIG. 9. Specifically, the rotational angle position of the first arm 4 relative to the swivel body 3 is adjusted so that the swivel body 3 and the first arm 4 are disposed in a second operational position, for example, substantially the origin position (step S11).

In this state, the distance measurement process (step S2) for the second distance is performed.

A difference between the measured second distance and the stored first distance is calculated (step S12), and it is determined whether or not the difference is equal to or smaller than a predetermined threshold value (step S13).

If the difference is larger than the predetermined threshold value, the process from step S11 is repeated. If the difference is smaller than or equal to the predetermined threshold value, the mastering process ends.

Accordingly, in the robot 1, the mastering fixture 50, the mastering system, and the mastering method according to this embodiment, the two members 2, 3, 4, 5, 7, 8, 9 constituting each rotational joint shaft are respectively provided with the mastering mounting surfaces 10 and 20 having the V-shaped grooves 12 and 22. Consequently, by simply bringing the V-shaped protrusions 64 and 74 of the first fixture 60 and the second fixture 70 into close contact with the V-shaped grooves 12 and 22, the first fixture 60 and the second fixture 70 are accurately disposed in a positioned state on each of the members 2, 3, 4, 5, 7, 8, and 9, whereby the mastering process can be accurately performed.

Specifically, the first fixture 60 and the second fixture 70 can be positioned on each of the members 2, 3, 4, 5, 7, 8, and 9 by using the V-shaped grooves 12 and 22 without being secured using bolts and pins. Machining of the mastering mounting surfaces 10 and 20 having the V-shaped grooves 12 and 22 can be performed more easily than machining of threaded holes and pin holes. It is also advantageous that the process for attaching the first fixture 60 and the second fixture 70 to each of the members 2, 3, 4, 5, 7, 8, and 9 can be performed readily without involving fastening of bolts or insertion of pins.

In this embodiment, the abutment surfaces 63 and 73 of the first fixture 60 and the second fixture 70 are brought into close contact with the mounting surfaces 11 and 21 of the mastering mounting surfaces 10 and 20 at the same time as when the V-shaped protrusions 64 and 74 are brought into close contact with the V-shaped grooves 12 and 22. The positioning of the first fixture 60 and the second fixture 70 can be performed by simply bringing the V-shaped grooves 12 and 22 into close contact with the V-shaped protrusions 64 and 74. In addition, the close contact between the abutment surfaces 63 and 73 and the mounting surfaces 11 and 21 is utilized in a supplementary fashion, so that by simply holding the abutment surfaces 63 and 73 with fingers to an extent that they do not move away from the mounting surfaces 11 and 21, tilting of the reference flat surface 60a of the first fixture 60 and positional displacement of the second fixture 70 can be easily prevented.

Furthermore, the robot 1 according to this embodiment includes the mastering mounting surfaces 10 and 20 having the V-shaped grooves 12 and 22 with the above-described functions. Therefore, as shown in FIG. 2, the mastering process can be performed simply by visually confirming, or confirming with a camera, that the groove bottoms 12a and 22a of the V-shaped grooves 12 and 22 in the two members 2, 3, 4, 5, 7, 8, 9 are disposed in the same plane. Specifically, this is advantageous in that the groove bottoms 12a and 22a of the V-shaped grooves 12 and 22 can be utilized as marking-off lines.

Although the mastering mounting surfaces 10 and 20, the mastering fixture 50, and the mastering method are described with reference to the second rotational joint shaft as an example in this embodiment, the mastering mounting surfaces 10 and 20, the mastering fixture 50, and the mastering method are similarly applicable to the other rotational joint shafts.

Specifically, as shown in FIG. 2, in the above embodiment, the outer peripheral surface around the second axis B of the swivel body 3 constituting the second rotational joint shaft and a side surface orthogonal to the second axis B of the first arm 4 are provided with the mastering mounting surfaces 10 and 20 having the V-shaped grooves 12 and 22 extending along flat surfaces that are orthogonal to each other.

Figure 10:
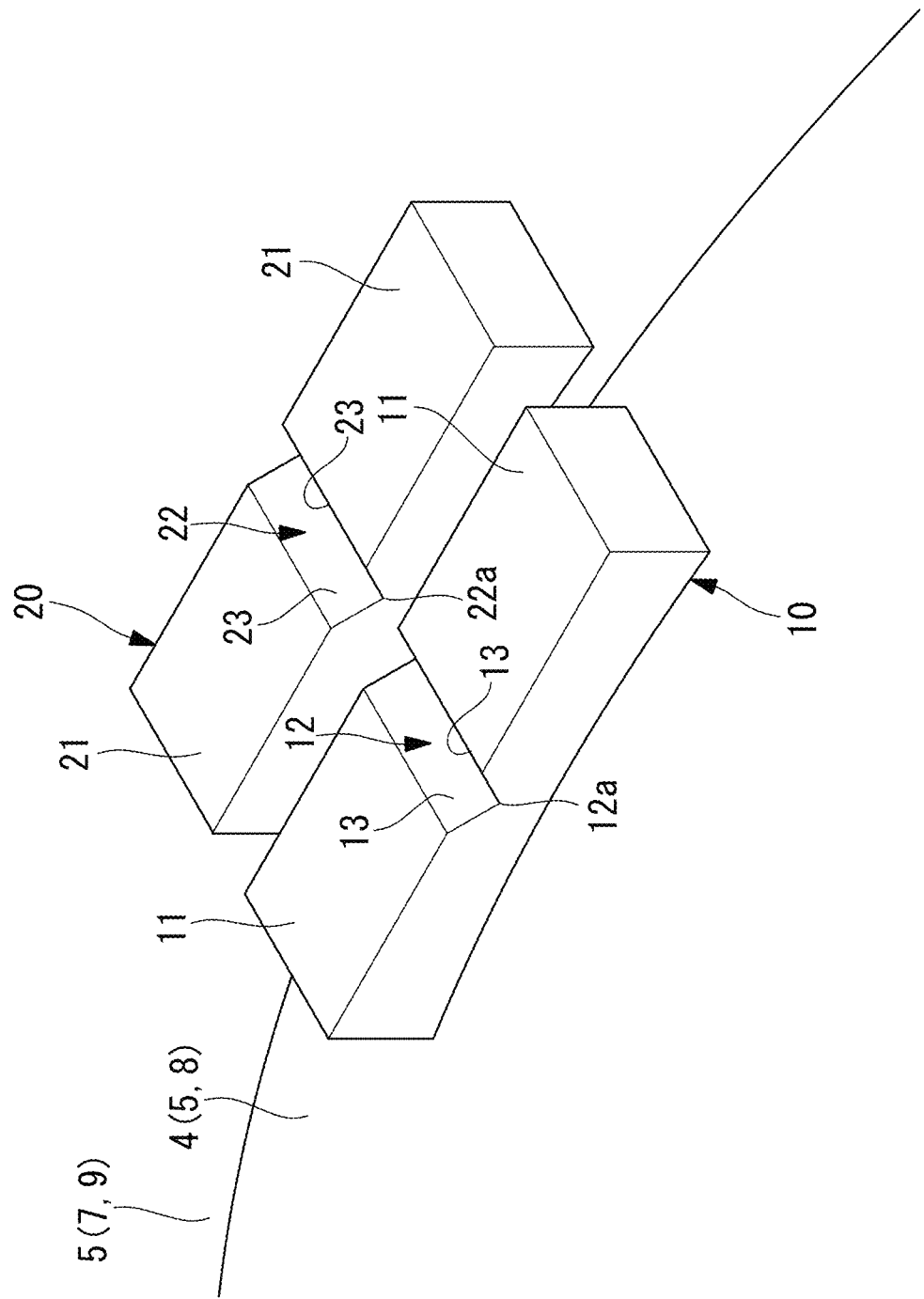
FIG. 10 is a perspective view illustrating a modification of the mastering mounting surfaces in FIG. 2.

As an alternative to the arrangement shown in FIG. 2, the mastering mounting surfaces 10 and 20 may be arranged as shown in FIG. 10. For example, in the robot 1 shown in FIG. 1, the mastering mounting surfaces 10 and 20 in FIG. 2 may be provided between the base 2 and the swivel body 3 constituting the first rotational joint shaft and between the first wrist component 7 and the second wrist component 8 constituting the fifth rotational joint shaft (not shown).

The mastering mounting surfaces 10 and 20 between the first arm 4 and the second arm 5 constituting the third rotational joint shaft, the mastering mounting surfaces 10 and 20 between the second arm 5 and the first wrist component 7 constituting the fourth rotational joint shaft, and the mastering mounting surfaces 10 and 20 between the second wrist component 8 and the third wrist component 9 constituting the sixth rotational joint shaft are as shown in FIG. 10.

The mastering mounting surfaces 10 and 20 in FIG. 10 are both provided on cylindrical surfaces around the axes C, D, and F. In the origin position, the V-shaped grooves 12 and 22 are disposed on the same line in the same plane or are disposed parallel to each other.

Figure 6:
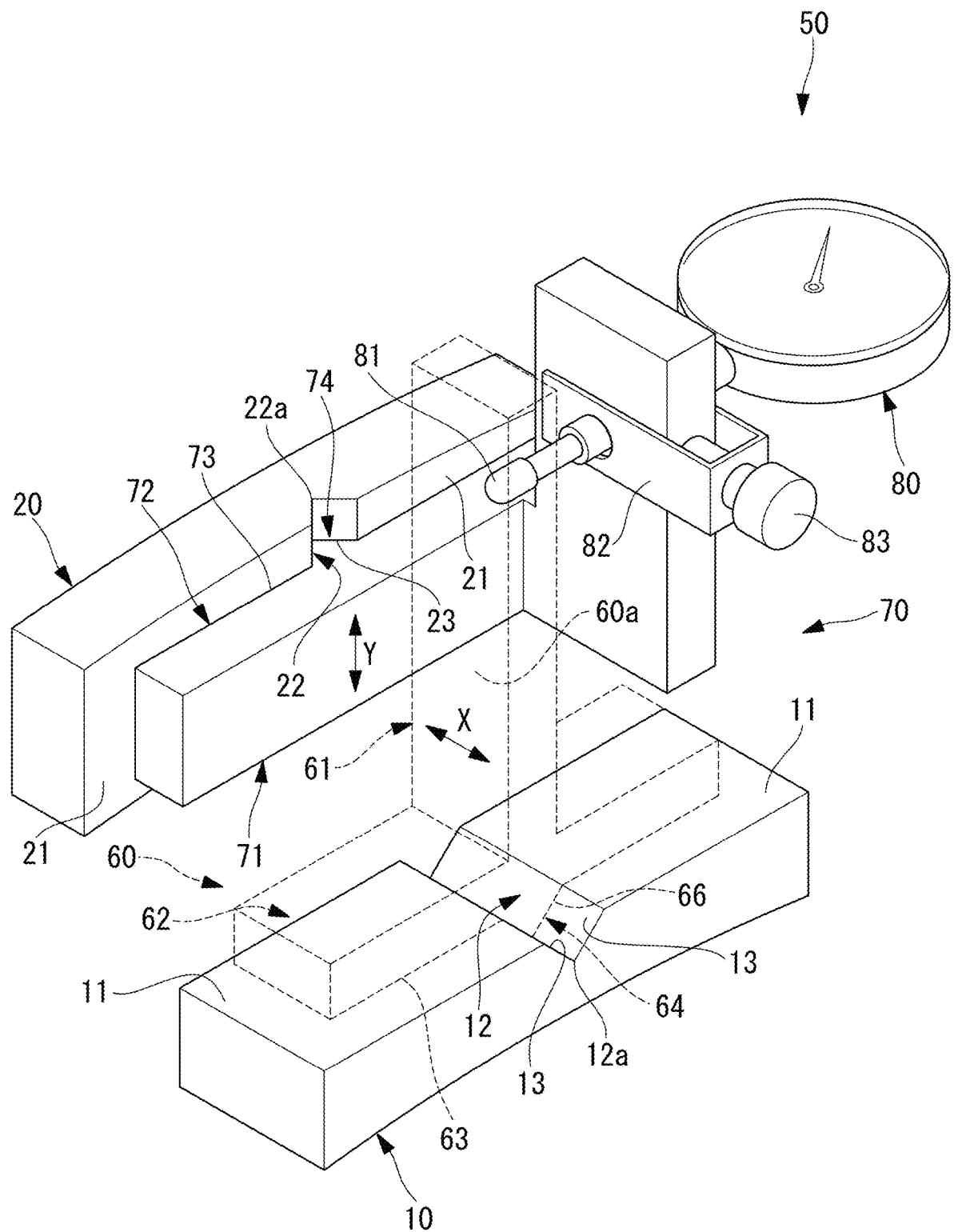
FIG. 6 is a perspective view illustrating an example of a mastering fixture according to an embodiment of the present disclosure disposed in a positioned state on the two mastering mounting surfaces in FIG. 2.
Figure 11:
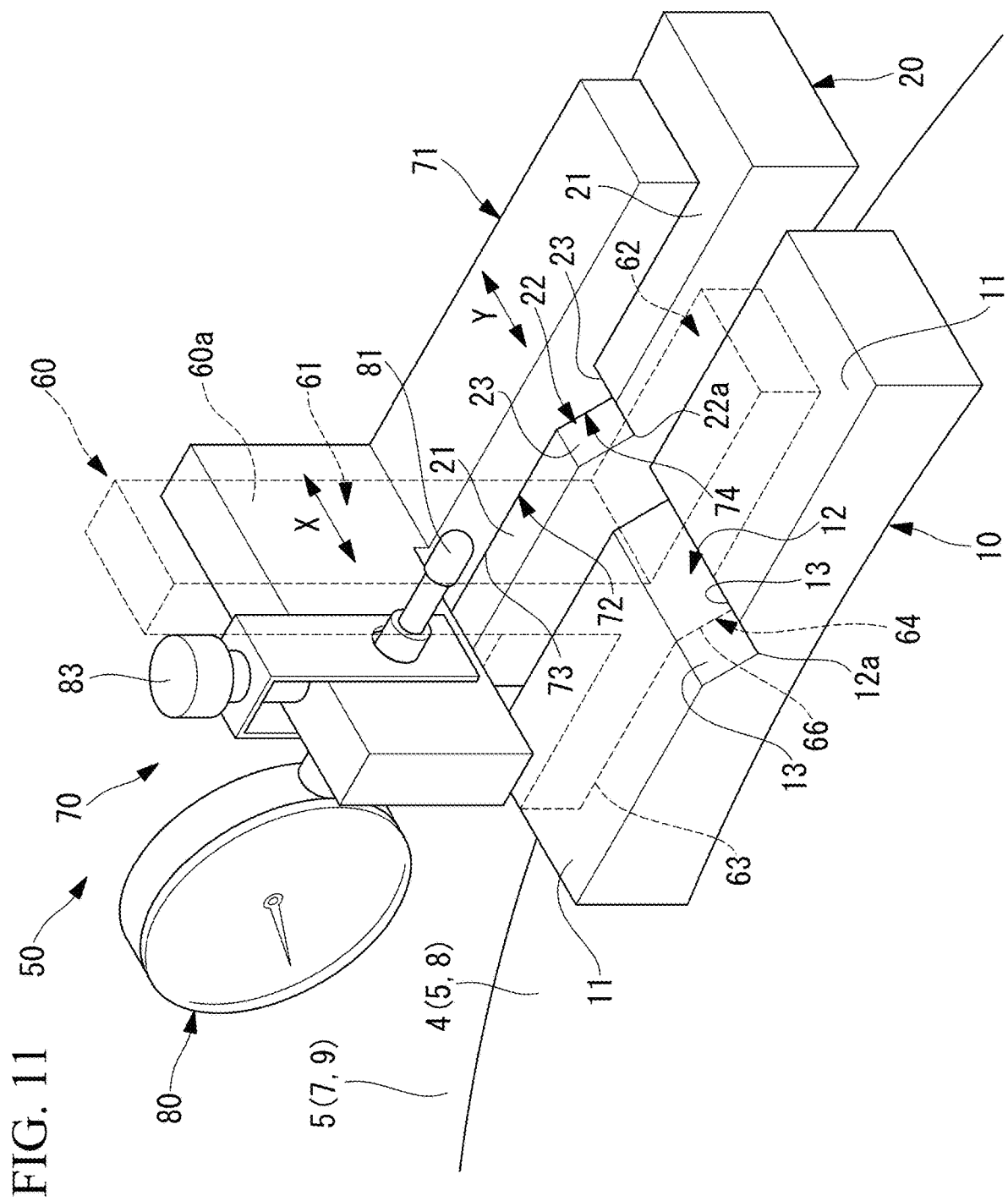
FIG. 11 is a perspective view illustrating an example of the mastering fixture in FIG. 6 disposed in a positioned state on the two mounting surfaces in FIG. 10.

With regard to each rotational joint shaft provided with such mastering mounting surfaces 10 and 20, the mastering process can be performed using the mastering fixture 50 identical to that in FIG. 6, as shown in FIG. 11. Specifically, the same mastering fixture 50 can be used in the mastering process of a plurality of rotational joint shafts. This is advantageous in that it is not necessary to prepare a plurality of types of mastering fixtures.

As an alternative to this embodiment in which the mastering mounting surfaces 10 and 20 are formed by machining the outer surfaces of the two members 2, 3, 4, 5, 7, 8, 9 constituting each rotational joint shaft, members 2, 3, 4, 5, 7, 8, and 9 having mastering mounting surfaces 10 and 20 may be fabricated as separate members and may be fixed in a positioned state on the members 2, 3, 4, 5, 7, 8, 9. Accordingly, this is advantageous in that, if the mastering mounting surfaces 10 and 20 break, the members 2, 3, 4, 5, 7, 8, and 9 having the mastering mounting surfaces 10 and 20 may simply be replaced, so that the members 2, 3, 4, 5, 7, 8, 9 constituting the rotational joint shafts do not need to be replaced.

Furthermore, in this embodiment, the abutment surfaces 63 and 73 are brought into close contact with the mounting surfaces 11 and 21 at the same time as when the V-shaped protrusions 64 and 74 are brought into close contact with the V-shaped grooves 12 and 22. Alternatively, for positioning the reference flat surface 60a and the dial gauge 80, the abutment surface 63 or 73 does not have to be provided. The abutment surface 63 or 73 is brought into close contact with the mounting surface 11 so as to prevent tilting of the reference flat surface 60a and the dial gauge 80 and to assist with a stable positioning process.

Figure 12:
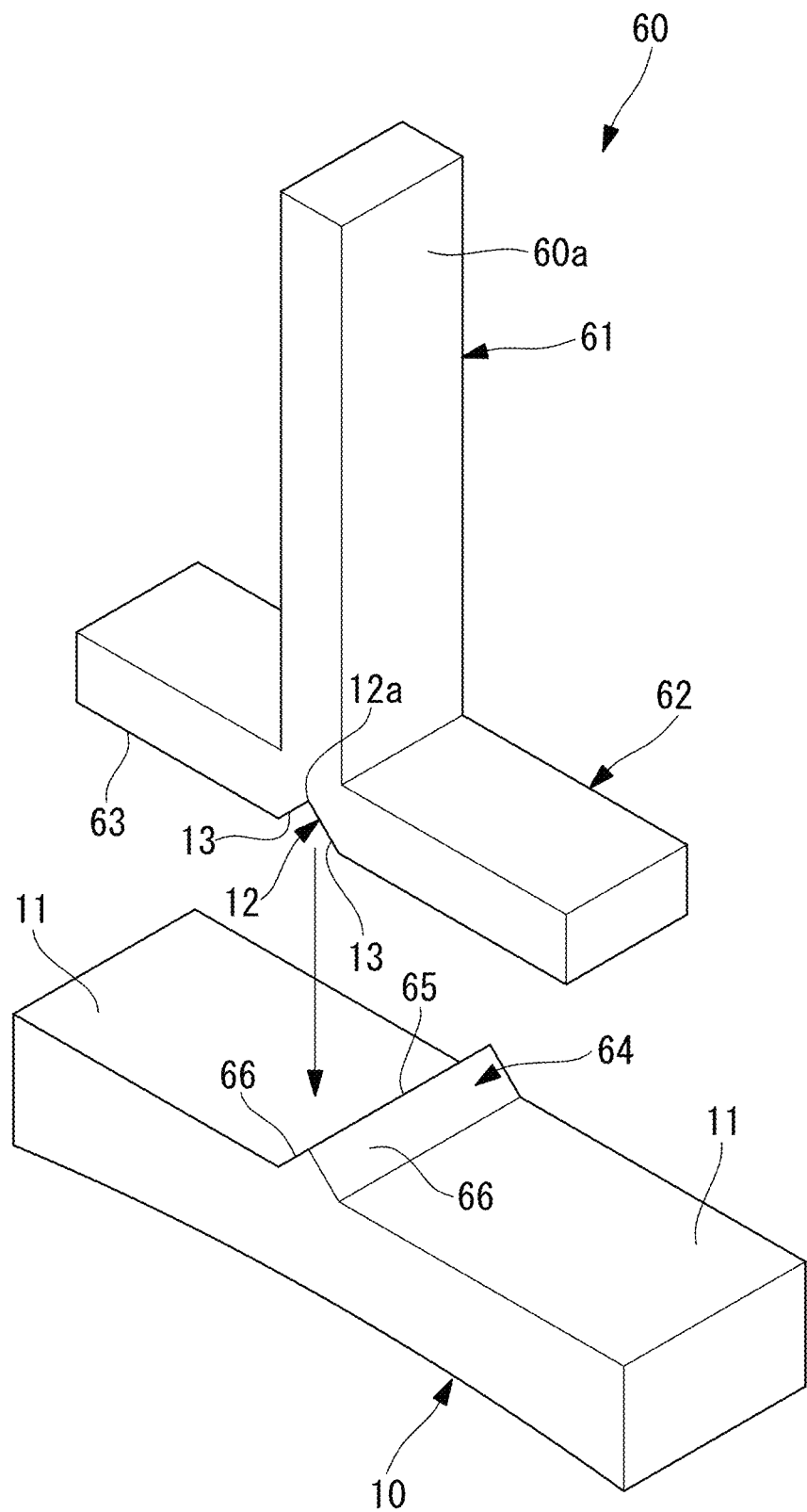
FIG. 12 is a perspective view illustrating a modification of the mastering mounting surface and the first fixture in FIG. 3.
Figure 13:
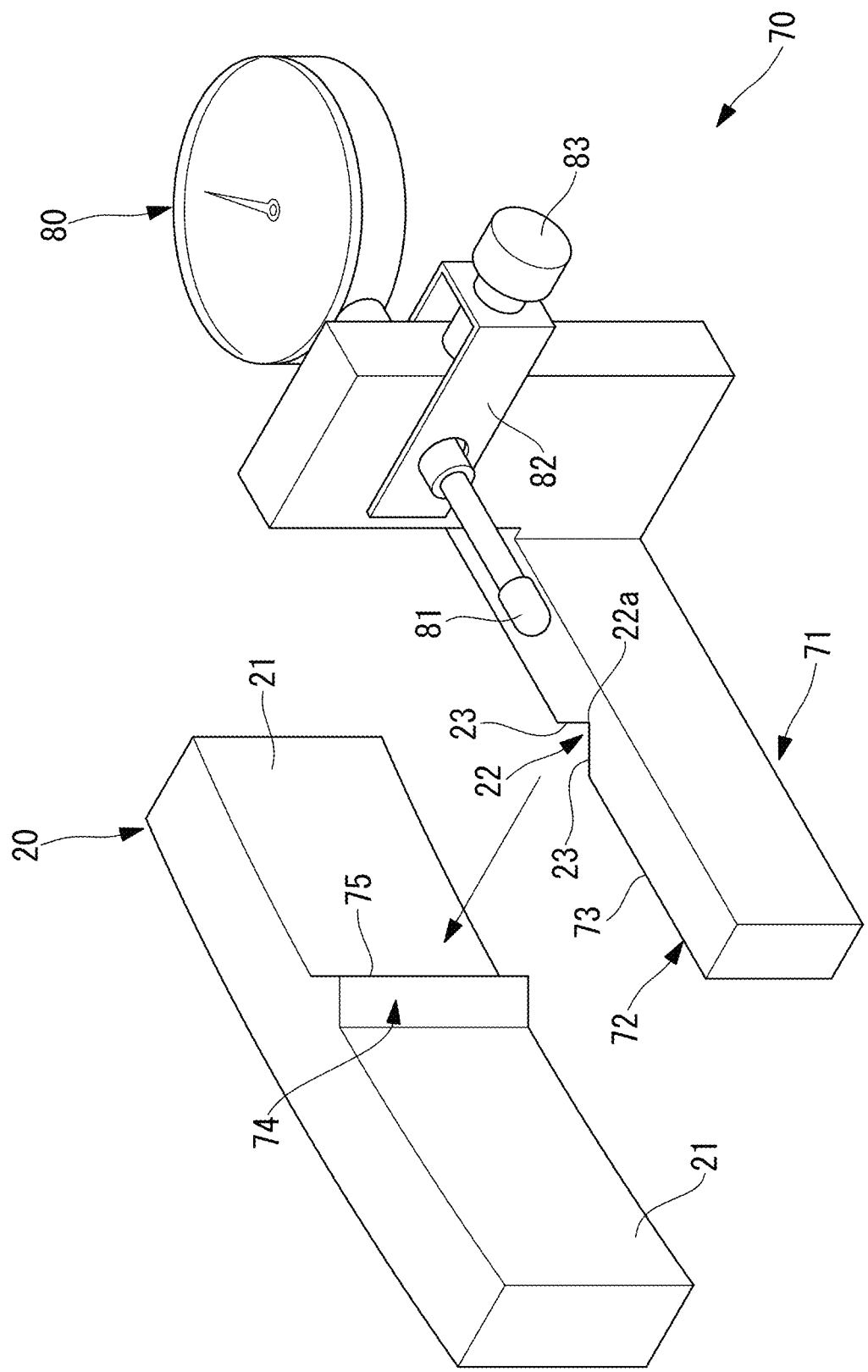
FIG. 13 is a perspective view illustrating a modification of the mastering mounting surface and the second fixture in FIG. 5.

Furthermore, as an alternative to this embodiment in which the mastering mounting surfaces 10 and 20 are provided with the V-shaped grooves 12 and 22 and the mastering fixture 50 is provided with the V-shaped protrusions 64 and 74, the configuration may be inverted, as shown in FIGS. 12 and 13. Moreover, one of the mastering mounting surfaces 10 and 20 may be provided with the V-shaped grooves 12 and 22, and the other one of the mastering mounting surfaces 10 and 20 may be provided with the V-shaped protrusions 64 and 74.

Although the groove bottoms 12a and 22a of the V-shaped grooves 12 and 22 provided in the mastering mounting surfaces 10 and 20 and the ridges 65 and 75 of the V-shaped protrusions 64 and 74 may be necessary as marking-off lines, the ridges 65 and 75 of the V-shaped protrusions 64 and 74 on the mastering fixture 50 or the linear groove bottoms 12a and 22a of the V-shaped grooves 12 and 22 are not necessarily required.

Figure 14:
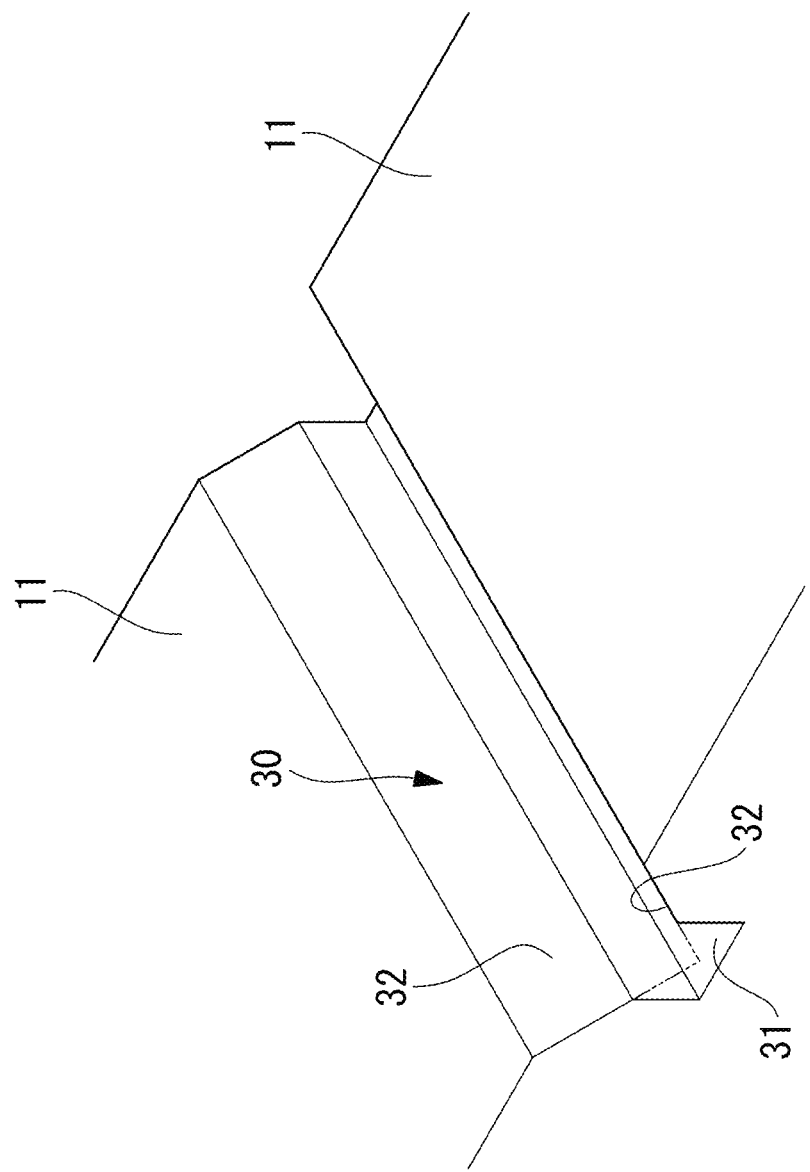
FIG. 14 is a perspective view illustrating a modification of a recess provided in the first fixture in FIG. 12 or the second fixture in FIG. 13.

For example, as shown in FIG. 14, a recess 30 may be capable of accommodating the V-shaped protrusion 64 or 74 and may have two sloped inner surfaces 32 intersecting each other at a linear imaginary groove bottom 31 extending orthogonally to the movement direction.

Furthermore, as shown in FIG. 15, a protrusion 40 may have two sloped outer surfaces 42 intersecting each other at a linear imaginary ridge 41 extending orthogonally to the movement direction.

Although this embodiment is applied to the robot 1 having six rotational joint shafts as an example, the embodiment may be applied to a robot having not only rotational joint shafts but also linear joint shafts alone or a mixture of rotational joint shafts and linear joint shafts.

The invention claimed is:

1. A mastering fixture for mastering a joint shaft of a robot comprising two members constituting a joint shaft and supported in a relatively movable manner, wherein the two members are each provided with a V-shaped groove having two sloped inner surfaces intersecting each other at a linear groove bottom extending orthogonally to a movement direction or a V-shaped protrusion having two sloped outer surfaces intersecting each other at a linear ridge extending orthogonally to the movement direction, and wherein when the two members of the joint shaft are disposed in a predetermined operational position, the groove bottoms, the ridges, or the groove bottom and the ridge, are disposed in alignment with each other, the mastering fixture comprising:

a first fixture including a protrusion having a shape configured to come into close contact simultaneously with the two sloped inner surfaces of the V-shaped groove in one of the members of the robot, or a recess having a shape capable of coming into close contact simultaneously with the two sloped outer surfaces of the V-shaped protrusion in the one of the members, the first fixture positioned in the movement direction relative to the one of the members in a state where the protrusion is in abutment with the V-shaped groove or the recess is in abutment with the V-shaped protrusion; and a second fixture including a protrusion having a shape configured to come into close contact simultaneously with the two sloped inner surfaces of the V-shaped groove in the other one of the members of the robot, or a recess having a shape capable of coming into close contact simultaneously with the two sloped outer surfaces of the V-shaped protrusion in the other one of the members, the second fixture being positioned in the movement direction relative to the other one of the members in a state where the protrusion is in abutment with the V-shaped groove or the recess is in abutment with the V-shaped protrusion, wherein one of the first fixture and the second fixture is provided with a reference surface extending orthogonally to the movement direction in a state where the one is positioned relative to the corresponding member, and wherein the other one of the first fixture and the second fixture is provided with a measurement device capable of measuring a distance to the reference surface in the movement direction in a state where the other one is positioned relative to the corresponding member.

2. A mastering system, comprising:

a robot comprising: two members constituting a joint shaft and supported in a relatively movable manner, wherein the two members are each provided with a V-shaped groove having two sloped inner surfaces intersecting each other at a linear groove bottom extending orthogonally to a movement direction or a V-shaped protrusion having two sloped outer surfaces intersecting each other at a linear ridge extending orthogonally to the movement direction, and wherein when the two members of the joint shaft are disposed in a predetermined operational position, the groove bottoms, the ridges, or the groove bottom and the ridge, are disposed in alignment with each other; and a mastering fixture comprising a first fixture including a protrusion having a shape configured to come into close contact simultaneously with the two sloped inner surfaces of the V-shaped groove in one of the members of the robot, or a recess having a shape capable of coming into close contact simultaneously with the two sloped outer surfaces of the V-shaped protrusion in the one of the members, the first fixture positioned in the movement direction relative to the one of the members in a state where the protrusion is in abutment with the V-shaped groove or the recess is in abutment with the V-shaped protrusion; and a second fixture including a protrusion having a shape configured to come into close contact simultaneously with the two sloped inner surfaces of the V-shaped groove in the other one of the members of the robot, or a recess having a shape capable of coming into close contact simultaneously with the two sloped outer surfaces of the V-shaped protrusion in the other one of the members, the second fixture being positioned in the movement direction relative to the other one of the members in a state where the protrusion is in abutment with the V-shaped groove or the recess is in abutment with the V-shaped protrusion, wherein one of the first fixture and the second fixture is provided with a reference surface extending orthogonally to the movement direction in a state where the one is positioned relative to the corresponding member, and wherein the other one of the first fixture and the second fixture is provided with a measurement device capable of measuring a distance to the reference surface in the movement direction in a state where the other one is positioned relative to the corresponding member.

3. A mastering method for mastering a joint shaft of a robot comprising two members constituting a joint shaft and supported in a relatively movable manner, wherein the two members are each provided with a V-shaped groove having two sloped inner surfaces intersecting each other at a linear groove bottom extending orthogonally to a movement direction or a V-shaped protrusion having two sloped outer surfaces intersecting each other at a linear ridge extending orthogonally to the movement direction, and wherein when the two members of the joint shaft are disposed in a predetermined operational position, the groove bottoms, the ridges, or the groove bottom and the ridge, are disposed in alignment with each other, the method further performed by using a mastering fixture comprising a first fixture including a protrusion having a shape configured to come into close contact simultaneously with the two sloped inner surfaces of the V-shaped groove in one of the members of the robot, or a recess having a shape capable of coming into close contact simultaneously with the two sloped outer surfaces of the V-shaped protrusion in the one of the members, the first fixture positioned in the movement direction relative to the one of the members in a state where the protrusion is in abutment with the V-shaped groove or the recess is in abutment with the V-shaped protrusion; and a second fixture including a protrusion having a shape configured to come into close contact simultaneously with the two sloped inner surfaces of the V-shaped groove in the other one of the members of the robot, or a recess having a shape capable of coming into close contact simultaneously with the two sloped outer surfaces of the V-shaped protrusion in the other one of the members, the second fixture being positioned in the movement direction relative to the other one of the members in a state where the protrusion is in abutment with the V-shaped groove or the recess is in abutment with the V-shaped protrusion, wherein one of the first fixture and the second fixture is provided with a reference surface extending orthogonally to the movement direction in a state where the one is positioned relative to the corresponding member, and wherein the other one of the first fixture and the second fixture is provided with a measurement device capable of measuring a distance to the reference surface in the movement direction in a state where the other one is positioned relative to the corresponding member, the mastering method comprising:

disposing the first fixture in a positioned state on one of the members and disposing the second fixture in a positioned state on the other one of the members relative to the joint shaft in a mastered state, and using the measurement device to measure a first distance when the two members are disposed in a first operational position;

storing the measured first distance;

disposing the first fixture in a positioned state on the one of the members and disposing the second fixture in a positioned state on the other one of the members relative to the joint shaft in a non-mastered state, and using the measurement device to measure a second distance when the two members are disposed in a second operational position; and moving the joint shaft until a difference between the measured second distance and the first distance becomes smaller than or equal to a predetermined threshold value.

* * * * *